United States Patent
Danilchenko et al.

(10) Patent No.: US 12,111,861 B2
(45) Date of Patent: Oct. 8, 2024

(54) DYNAMIC ONTOLOGY DATA OPERATION

(71) Applicant: Schneider Electric USA, Inc., Andover, MA (US)

(72) Inventors: Victor Danilchenko, South Hadley, MA (US); Charbel Joseph El Kaed, Boston, MA (US); Imran Khan, Grenoble (FR); John Brodeur, Londonderry, NH (US)

(73) Assignee: Schneider Electric USA, Inc., Boston, MA (US)

( * ) Notice: Subject to any disclaimer, the term of this patent is extended or adjusted under 35 U.S.C. 154(b) by 90 days.

(21) Appl. No.: 17/283,069

(22) PCT Filed: Oct. 9, 2019

(86) PCT No.: PCT/US2019/055463
§ 371 (c)(1),
(2) Date: Apr. 6, 2021

(87) PCT Pub. No.: WO2020/076998
PCT Pub. Date: Apr. 16, 2020

(65) Prior Publication Data
US 2021/0382928 A1 Dec. 9, 2021

Related U.S. Application Data

(60) Provisional application No. 62/776,745, filed on Dec. 7, 2018, provisional application No. 62/743,333, filed on Oct. 9, 2018.

(51) Int. Cl.
*G06F 16/36* (2019.01)
*G06F 16/21* (2019.01)
(Continued)

(52) U.S. Cl.
CPC .......... *G06F 16/367* (2019.01); *G06F 16/212* (2019.01); *G06F 16/2379* (2019.01);
(Continued)

(58) Field of Classification Search
CPC .... G06F 16/367; G06F 16/2379; G06F 16/26; G06F 16/2465; G06F 16/2455; G06F 16/212
See application file for complete search history.

(56) References Cited

U.S. PATENT DOCUMENTS 6,640,249 B1 * 10/2003 Bowman-Amuah ..... G06F 8/36
709/228
7,529,811 B2 * 5/2009 Thompson ............ G06F 16/284
707/999.005
(Continued)

FOREIGN PATENT DOCUMENTS

WO WO2017173104 A1 10/2017
WO WO2017173104 A8 10/2017

OTHER PUBLICATIONS

International Search Report and Written Opinion mailed Jan. 9, 2020 in PCT/US2019/55463, 19 pp.
(Continued)

*Primary Examiner* — Mark E Hershley
(74) *Attorney, Agent, or Firm* — Locke Lord LLP

(57) ABSTRACT

A method and system are provided for dynamically linking device data models and asset data models. A first data model link between a first one or more asset data model components of an asset data model and a first one or more device data model components of a device data model is dynamically updated. The device data model is processed to determine normalized data relationship paths utilized by an inference engine to populate a device element data set. A first determined normalized data relationship path for a first device(s) is inferred. The method and system execute an
(Continued)

asset data model query against the asset data model comprising analyzing asset data model component metrics by querying the device element data set, based on the updated first data model link, and generate an asset data model descriptive analytics determination output, based on the execution of the asset data model query.

23 Claims, 13 Drawing Sheets

(51) Int. Cl.
  *G06F 16/23* (2019.01)
  *G06F 16/2455* (2019.01)
  *G06F 16/2458* (2019.01)
  *G06F 16/26* (2019.01)
  *G06N 5/04* (2023.01)
(52) U.S. Cl.
  CPC ...... *G06F 16/2455* (2019.01); *G06F 16/2465* (2019.01); *G06F 16/26* (2019.01); *G06N 5/04* (2013.01); *G06F 2216/03* (2013.01)

(56) References Cited

U.S. PATENT DOCUMENTS

| | | | | |
|---|---|---|---|---|
| 8,010,909 | B1* | 8/2011 | Hanson | G06F 16/26 715/854 |
| 9,830,395 | B2* | 11/2017 | Mullins | G06F 16/9537 |
| 2007/0055760 | A1* | 3/2007 | McCoy | H04L 41/22 709/223 |
| 2007/0136788 | A1* | 6/2007 | Monahan | H04L 63/20 726/14 |
| 2009/0254572 | A1* | 10/2009 | Redlich | G06Q 10/10 |
| 2010/0023865 | A1* | 1/2010 | Fulker | G08B 25/14 700/286 |
| 2011/0270779 | A1* | 11/2011 | Showalter | G06Q 40/02 705/36 R |
| 2012/0011126 | A1* | 1/2012 | Park | G06F 9/541 707/769 |
| 2012/0209709 | A1* | 8/2012 | Ramer | G06Q 30/0273 705/14.51 |
| 2014/0279808 | A1* | 9/2014 | Strassner | G06Q 10/06 706/47 |
| 2015/0135206 | A1* | 5/2015 | Reisman | H04H 20/93 725/18 |
| 2015/0135214 | A1* | 5/2015 | Reisman | H04H 60/35 725/37 |
| 2015/0379400 | A1* | 12/2015 | Tatourian | H04L 67/535 706/46 |
| 2016/0021181 | A1* | 1/2016 | Ianakiev | G06Q 10/10 709/204 |
| 2016/0344772 | A1* | 11/2016 | Monahan | G06F 16/248 |
| 2017/0235848 | A1* | 8/2017 | Van Dusen | G06Q 10/101 705/12 |
| 2017/0249325 | A1* | 8/2017 | Vangala | G06F 16/9024 |
| 2017/0351226 | A1* | 12/2017 | Bliss | G05B 19/4063 |
| 2017/0351958 | A1* | 12/2017 | Ghosh | G06N 5/04 |
| 2018/0357334 | A1* | 12/2018 | Chao | G06F 16/10 |
| 2019/0147412 | A1* | 5/2019 | Chiaramonte | G06Q 10/20 705/7.13 |
| 2019/0340337 | A1* | 11/2019 | Faulhaber | G06F 21/105 |
| 2020/0011784 | A1* | 1/2020 | Chalumuri | G06Q 10/20 |
| 2020/0410415 | A1* | 12/2020 | Harris | G06Q 10/0635 |

OTHER PUBLICATIONS

Terkaj Walter, et al.: "Reusing Domain Ontologies in Linked Building Data: the Case of Building Automation and Control", JOWO 2017 The Joint Ontology Workshops: Proceedings of the Joint Ontology Workshops 2017 Episode 3: The Tyrolean Autumn of Ontology CEUR-WS, Jan. 1, 2017 (Jan. 1, 2017), pp. 1-13, XP055916057, Retrieved from the Internet: URL:https://pure.tue.nl/ws/files/138828082/FOMI_paper_4.pdf [retrieved on Apr. 27, 2022] abstract, Section 4.2 , Section 5, Fragment 1-5.

Martin Bauer, et al.: "Semantic Interoperability for the Web of Things", Aug. 27, 2016 (Aug. 27, 2016), XP055441479, DOI: 10.13140/RG.2.2.25758.13122 Retrieved from the Internet: URL:https://www.researchgate.net/profile/Pau_Murdock/publication/307122744_Semantic_Interoperability_for_the_Web_of_Things/links/57cldf6008aedalec38cf5f5/Semantic-Interoperability-for-the-Web-of-Things.pdf [retrieved on Jan. 16, 2018] Section "Introduction" Section What is an Ontology, Section"Ontologies and Modularity" Section "Designing Semantic Models" figures 5-7,10.

Konstantinos Kotis, et al.: "An ontology for the automated deployment of applications in heterogeneous IoT environments 1", Aug. 31, 2012 (Aug. 31, 2012), XP055218345, Retrieved from the Internet: URL:<http://www.semantic-web-journal.net/sites/default/files/swj247_0.pdf [retrieved on Oct. 5, 2015] abstract, Section 1, Section 4.1, Section 4.2.

El Kaed Charbel: "Home Devices Mediation using ontology alignment and code generation techniques", Jan. 13, 2012 (Jan. 13, 2012), pp. 1-240, XP055915606, Retrieved from the Internet: URL:<https://tel.archives-ouvertes.fr/file/index/docid/680022/filename/ELKAED-Charbel_2012_archivage.pdf [retrieved on Apr. 26, 2022] the whole document.

Extended European Search Report and Written Opinion dated May 9, 2022 for corresponding European Application No. EP19870702.8-1203, 16 pages.

El Kaed Charbel et al: "SQenIoT: Semantic Query Engine for Industrial Internet-Of-Things Gateways", Feb. 9, 2017 (Feb. 9, 2017), pp. 1-6, XP093113570, Retrieved from the Internet: URL:https://ieeexplore.ieee.org/stampPDF/getPDF.jsp? tp=&arnumber=7845468&ref=aHR0cHM6Ly9pZWVleHBsb3JlLmllZWUub3JnL2RvY3VTZW50Lzc4NDUONjg=.

European Examination Report dated Dec. 22, 2023 for corresponding European Application No. 19870702.8, 18 pages.

* cited by examiner

DYNAMIC ONTOLOGY DATA OPERATION

CROSS-REFERENCE TO RELATED APPLICATIONS

This application claims the benefit of priority to U.S. Provisional Patent Application Ser. No. 62/743,333 filed Oct. 9, 2018 and U.S. Provisional Patent Application Ser. No. 62/776,745 filed Dec. 7, 2018, the disclosures of which are herein incorporated by reference in their entirety.

TECHNICAL FIELD

The present disclosure relates to digital data organization, and more specifically to systems and techniques for organizing data associated with distributed systems using dynamic ontologies.

BACKGROUND

The Internet of Things (IoT) promises to interconnect elements together on a massive scale. These connected elements may include devices, vehicles, homes, cities, and any other system or collection of systems that contain the applicable electronic hardware, software, sensors, and connectivity that enables these systems to collect and exchange data. Such amalgamation allows this massive amount of data, when collected on a global scale, to be transformed into knowledge and actionable information. Interactions and collaborations between systems form to fulfill one or more specific tasks. Such tasks differ according to the context and environment of application. For example, tasks may range from sensing and monitoring of an environmental characteristic such as temperature or humidity of a single room to controlling and optimization of an entire building or facility to achieve a larger objective such as an energy management strategy.

Depending on the application, connected elements include heterogeneous and/or homogenous hardware that facilitate sensing, operation, actuation, data capture, data storage, data processing and/or data analytics. Each type of element includes a unique data structure that details a digital representation of the capabilities of the hardware itself and/or measured parameters. For example, a temperature sensor may implement different hardware to facilitate temperature measurements. This hardware may also in turn provide different data parameters, values, and/or operational units, such as temperature measurement units, time format, MAC address, IP address, and/or CPU type data.

Data structure unit, value, and parameter complexities are exacerbated by storage and organization distributions that may exist situated across any number of memory storage locations or hybrid data structures within multiple repositories. Furthermore, such complexities can be further exacerbated by requirements for compatibility with any associated cloud services. Further, while there is presently a tight coupling between a particular cloud application and the on-premises connected gateway, system, or device, such a tight coupling places very high dependency between for a user or system to update the respective data model to allow access to the necessary data. Accordingly, with truly massive amounts of heterogeneous data available through the wide variety of available connected elements and their respective data structures tightly bound to an associated cloud service, efficiently and effectively accessing and analyzing this voluminous data presents a serious challenge.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments described herein, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

SUMMARY

Figure 1:
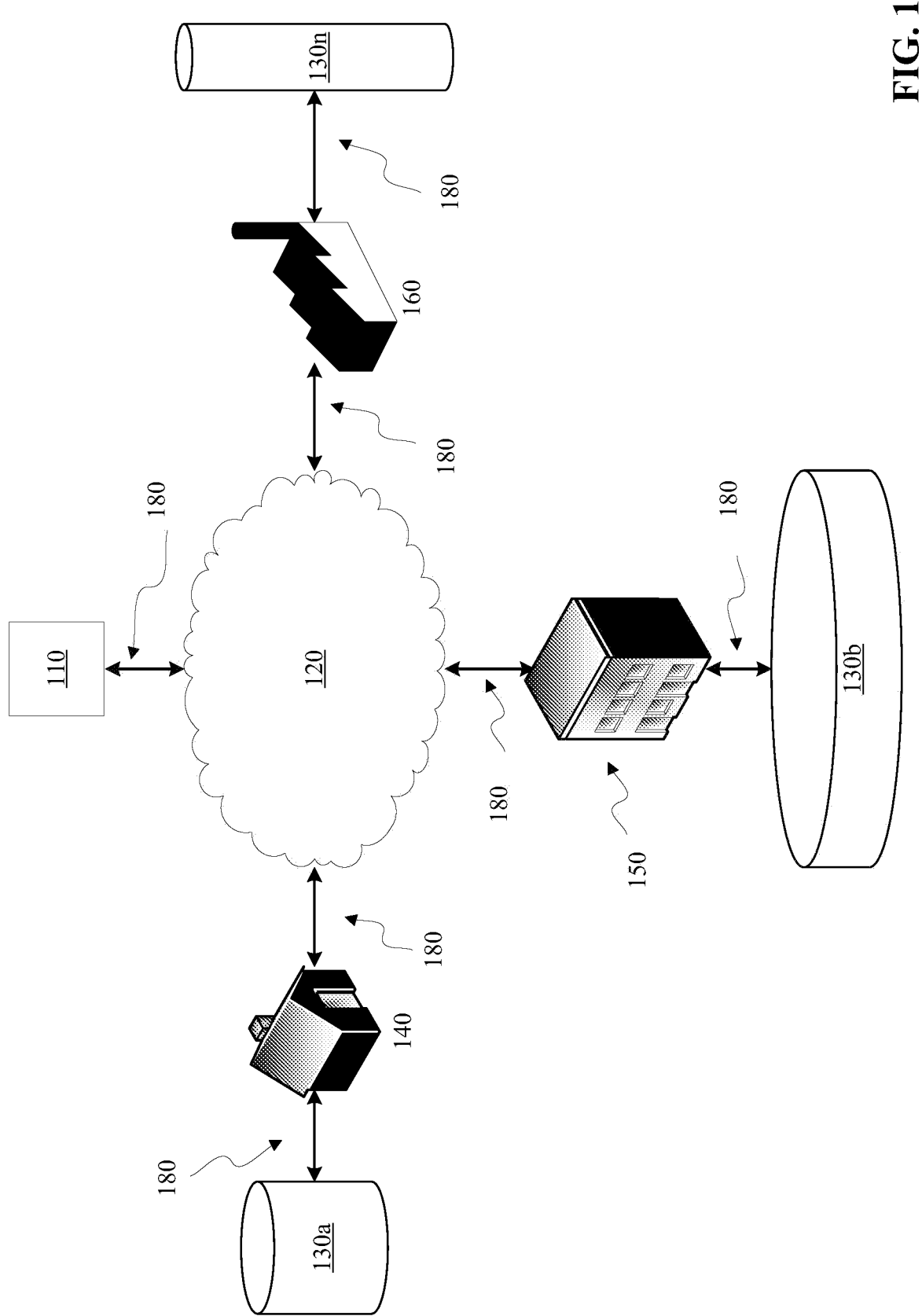
FIG. 1 illustrates aspects of a system for dynamic ontology data operation in accordance with various embodiments described herein.

Embodiments described herein provide a method, system and non-transitory computer-readable medium that include dynamically updating a first data model link between a first one or more asset data model components of an asset data model and a first one or more device data model components of a device data model. The device data model contains data collected from a plurality of devices and organized based on one or more attributes of the plurality of devices. The method, system and non-transitory computer-readable medium further include processing the device data model to determine normalized data relationship paths utilized by the inference engine to populate a device element data set. Additionally, the method, system and non-transitory computer-readable medium include executing, by operation of one or more computer processors, an asset data model query against the asset data model comprising analyzing asset data model component metrics by querying the device element data set, based on the updated first data model link. The method, system and non-transitory computer-readable medium also include generating an asset data model descriptive analytics determination output, based on the execution of the asset data model query.

DETAILED DESCRIPTION

To assure valued assets are protected, systems and their associated devices now monitor nearly all critical data coming from an asset and associated external data that may be relevant to such an asset. This avalanche of data can be exceedingly complex to navigate and so granular in nature as to be useless by itself to determine the health of a given asset. While an asset may contain a series of very complex systems, an individual responsible for such an asset may simply need a "go" or "no go" to determine a next step.

To address the problems of the complexity of managing a wide array of disparate data structures into an organized, human usable format, among others, systems and methods for dynamic ontology data operation may be utilized as described in this disclosure.

Embodiments of the present disclosure provide several benefits. These include, but are not limited to, an ability for development teams of various components of the system to work independently from each other. Additionally, each device or system component is compartmentalized and can be developed independently without modification of the cloud-based application. Increased flexibility through dynamic configuration is supported. In one example, when a new sensor with its measurement are added to a gateway device, the associated cloud application is automatically capable of adding the associated data structure, along with its characteristics and relationships. Finally, each team can be provided with enabling libraries to accelerate their implementation and reduce development time.

Additionally, embodiments described herein can facilitate the control of devices or system components represented by the asset and device data models. Thus, while information can be collected from the various devices and system components (i.e., data can flow in a northbound direction), embodiments can further provide control logic that can orchestrate control operations for the devices and system components (i.e., control instructions can flow in a southbound direction).

In a particular embodiment, the model can be expanded to model a new type of device. In doing so, embodiments can provide a human machine interface that is dynamically generated based on existing asset and device data models. For example, upon receiving a request to model a new device, embodiments could use the existing asset and device data models to determine known device types, and could dynamically generated a graphical user interface that shows a list of device types the user can choose from for the new device. In one embodiment, such an interface also includes an option for the creation of a new device type. Upon receiving a selection of an existing device type, embodiments could determine known attributes of the device type based on the existing asset and device data models. Such known attributes can include not only the physical characteristics of the device (e.g., that the device is configured with an actuator such as a button or slider, as well as a plurality of sensor devices), but can also include usage attributes of the device (e.g., that the device implements a particular control loop and that a particular aspect of the device is controllable to some extent). Additionally, the known attributes can include human machine interface attributes of the device (e.g., that the particular control loop is represented as UI control elements, such as virtual buttons shown on a touchscreen display device). In this way, the asset and device data models can represent the devices using a model-view-controller architecture (e.g., where the model corresponds to the physical characteristics of the device, the view corresponds to the human machine interface attributes of the device, and the controller corresponds to the usage attributes of the device).

For example, upon receiving a selection of a first device type, embodiments could determine (based on the existing asset and device data models) that devices of the first device type include a light-emitting diode (LED) display, one or more sensors, that the LED display is controllable, that the sensor data is historizable, and that the historizable data is represented as a graph or a diagram on the LED display of the device. Embodiments can dynamically generate a graphical user interface that prompts the user to confirm or modify these determinations about the new device being added. In doing so, embodiments can use existing knowledge stored in the asset and device data models to provide an improved user interface.

For new type of device, describe device in domain model terms (performs certain measurements, has certain actuators, has location/organizational relationships, etc.) but we also want to relate it to the asset model. Device measures flux, metric is averageable, can be graphed, maintainable state, can be connected to control devices to measure their behavior in terms of monitoring, etc. All can be determined by the asset model. This gives us business context for the device. UI could provide different domain areas (e.g., safety system), linked to an existing system or device (linked to a control loop, linked to a monitoring device), FIG. 1 illustrates aspects of a system that facilitates and/or the execution of a dynamic ontology data organization. The system for executing a dynamic ontology data operation method may include one or more processing systems 110 and a cloud-computing environment 120. Connected to a cloud-computing environment 120 are various building types such as residential, commercial, and/or industrial facilities (140, 150, and 160 respectively). Each building may have associated data storage arrays (130a, 130b, and 130n respectively). One or more connected elements (shown in FIG. 2) are associated with these buildings, as are network connections 180 to allow the exchange of data between parts of the system.

There are no limitations implied to the type or number of buildings comprising a system for a sequential federated query method 100. Embodiments for example, may include homes 140 and an associated data storage array 130a, office buildings 150 and an associated data storage array 130b, or industrial installations 160 and an associated data storage array 130n. Each building may maintain a network connection 180 to the cloud-computing environment 120 and from the connected elements in each building to each storage array via a network connection 180. It should be appreciated various parts of a system for a sequential federated query method 100 facilitate co-located or remote storage or processing solutions. For example, a data storage array 130*a* for a residence 140 may be located within the residence 140 itself, outside yet nearby, in the cloud-computing environment 120, and/or distributed across one or more storage nodes.

In one embodiment of the system illustrated in FIG. 1, the building 150 contains one or more connected elements that perform sensing, actuation, data capture, storage, or processing for the monitoring or management of the building 150. Any variety of connected elements may be used to capture, store, process data, actuate, and/or operate associated devices over the network connections 180, to the cloud-computing environment 120, to other parts of the system. These connected elements may include hardware, modules, and/or sensors.

For example, connected elements, sensors, or hardware may be configured for detecting temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate, control, or articulate other connected elements, components, and/or other systems, such as turning on lights, opening a door or window, moving window shades, or triggering a door lock. Connected elements may possess the ability to process data from other connected elements or propagate data from one or more connected elements to one or more other connected elements. Such hardware processing ability may be in addition to, or as a substitute for, measuring the environmental parameters through a sensor. Any number of connected elements may be deployed in any combination to monitor or manage a physical space, including for example a closet, room, residence, commercial building, campus, office, promenade, industrial setting, or any other desired location.

Each building containing a connected element may ultimately connect to a cloud-computing environment 120 through a network connection 180. This network connection 180 allows access to the cloud-computing environment 120 by a variety of devices capable of connecting to such an environment in either a wired or wireless connection manner. From FIG. 1, such devices may include one or more processing systems 110 capable of receiving input from a user or to provide autonomous operation. It should be appreciated a cloud computing environment 120, while providing additional communication paths to additional connected elements or systems, is not required as part of the dynamic ontology data operation method. Embodiments contemplate self-contained, stand-alone, or distributed systems.

Figure 2A:
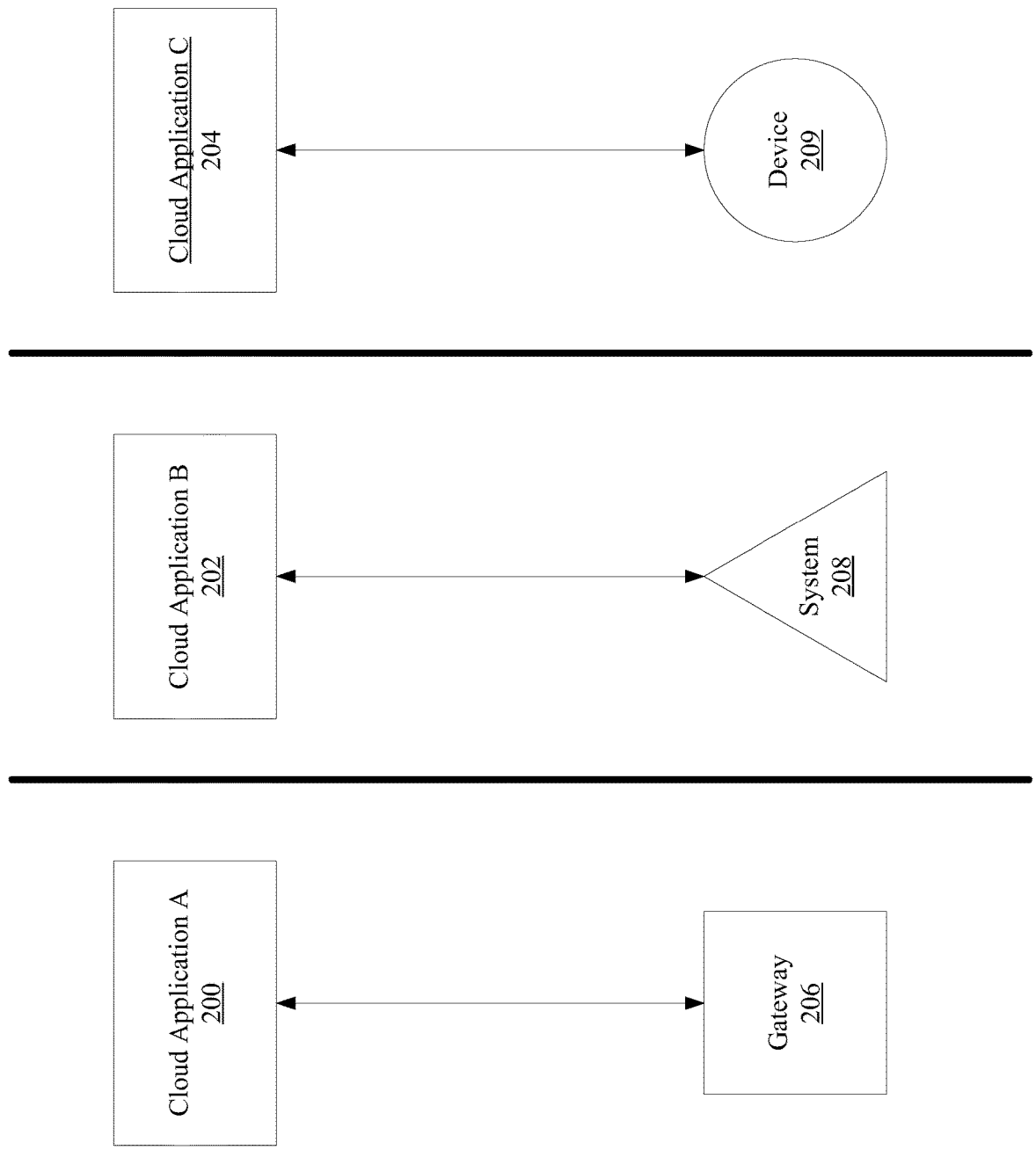
FIG. 2A illustrates aspects of a tightly associated cloud application to hardware element which currently exists.

FIG. 2A illustrates aspects of a tightly associated cloud application to hardware elements which currently exists. Such a tight coupling places very high dependency between for a user or system to update in the respective data model to allow access to the necessary data. Accordingly, with truly massive amounts of heterogeneous data available through the wide variety of available connected elements and their respective data structures tightly bound to an associated cloud service, efficiently and effectively accessing and analyzing this voluminous data presents a serious challenge.

Examples of such cloud applications may range from a timeseries charting application showing temperature, humidity, or energy to a more advanced application such as an asset monitoring application displaying the health of a system by aggregating the health of its sub-components.

Figure 2B:
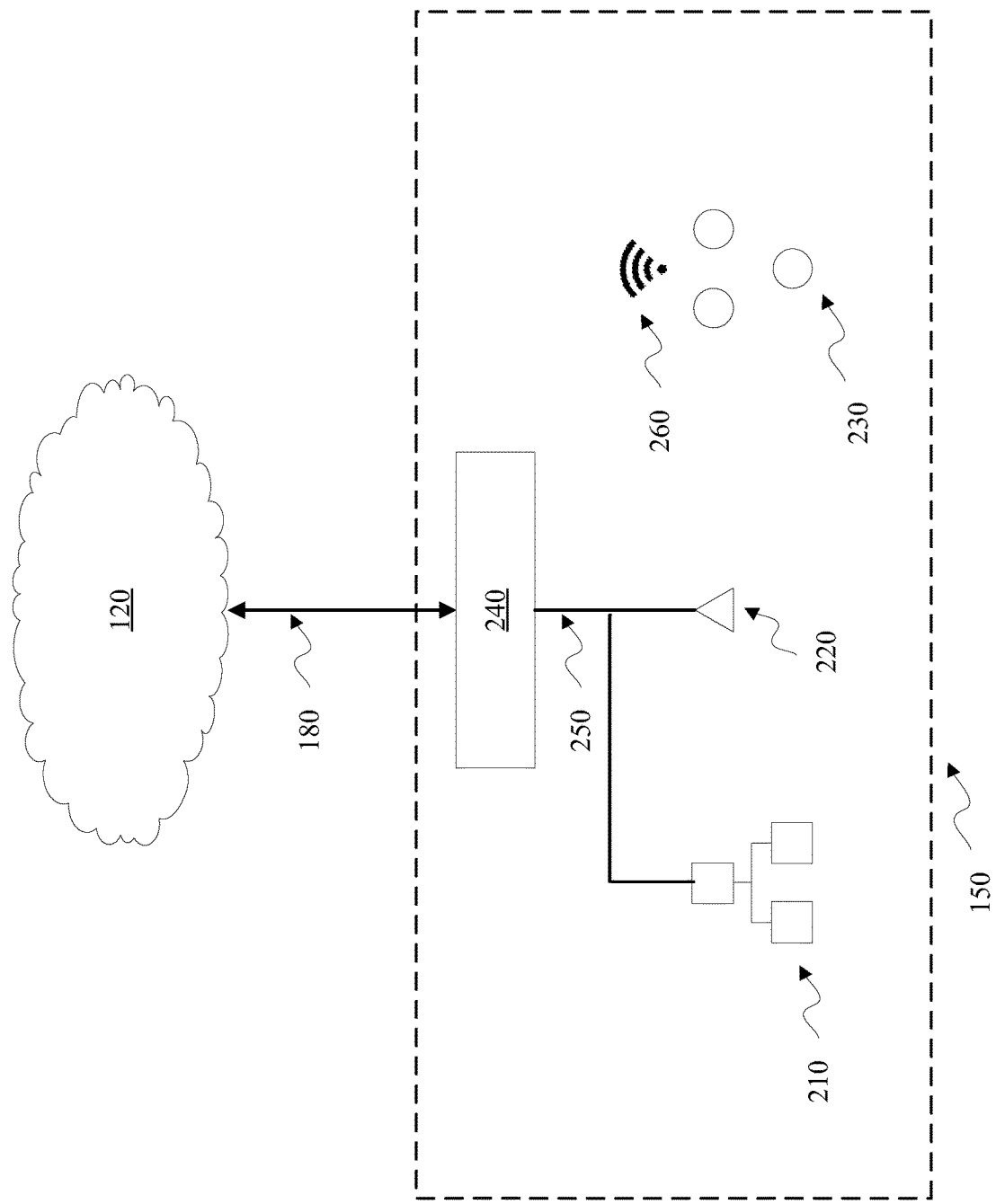
FIG. 2B illustrates aspects of heterogeneous hardware connected elements that may connect to a system for executing a dynamic ontology data operation method in accordance with various embodiments described herein.

FIG. 2B illustrates aspects of heterogeneous hardware connected elements that may connect to a system for executing a dynamic ontology data operation method in accordance with various embodiments described herein. In one embodiment, the building 150 contains one or more types of connected elements 210, 220, 230, 240 for the monitoring or management of the structure. These connected elements 210, 220, 230, 240 communicate via a wired 250 or wireless 260 networks and makes the data structures from each connected element available to the cloud environment 120 via the network connections 180. The network connections 180 may include wired and/or wireless connection types.

For example, such connections may include, but are not limited to, any physical cabling method such as category 5 cable, coaxial, fiber, copper, twisted pair, or any other physical media to propagate electrical signals. Wireless connections may include, but are not limited to personal area networks (PAN), local area networks (LAN), Wi-Fi, Bluetooth, cellular, global, or satellite-based communication networks. Access between the cloud environment 120 and any other cloud environment is possible in other implementations these other cloud environments are configured to connect with devices similar to cloud environments such as the existing cloud environment 120. It is to be understood that the computing devices shown in the figures and discussed herein are intended to be illustrative only and that computing nodes and cloud computing environments may communicate with any type of computerized device over any type of network with addressable or direct connections.

Any variety of connected elements may be used to perform organizing, making accessible, analysis, and operating or sensing, actuation, data capture, storage, or processing over the network connection 180, to the cloud-computing environment 120, to other parts of the system. Accordingly, these devices may have different data parameters, fields, units, or general overall data structure associated with each device, respectively.

For example, as illustrated in FIG. 2B, connected elements 210 may be connected sensors to measure carbon dioxide for monitoring air quality of the building 150 and communicate via a wired network connection 250. Connected elements may be both configured to acquire data and control various modules for example a connected sensor to detect ambient light and an actuator 220 are implemented to change the state of an occupant light fixture and communicate via a wired network connection 250. Connected elements may be connected sensors for temperature and humidity 230 to monitor environment of the building 150 and communicate via a wireless network connection 260. Finally, connected element 240 serves as a connected gateway to communicate with the associated connected elements 210, 220, 230, via their respective network connections 250, 260, process the data structures of each, and transmit it to a network connection 180 for transmission to the cloud environment 120. It should be appreciated a cloud computing environment 120, while providing additional communication paths to additional devices or systems, is not required as part of the sequential federated query method. Other embodiments contemplate self-contained, stand-alone systems, and/or distributed systems.

These connected elements need not be geographically localized or logically grouped in any way to utilize embodiments described herein. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

Figure 3:
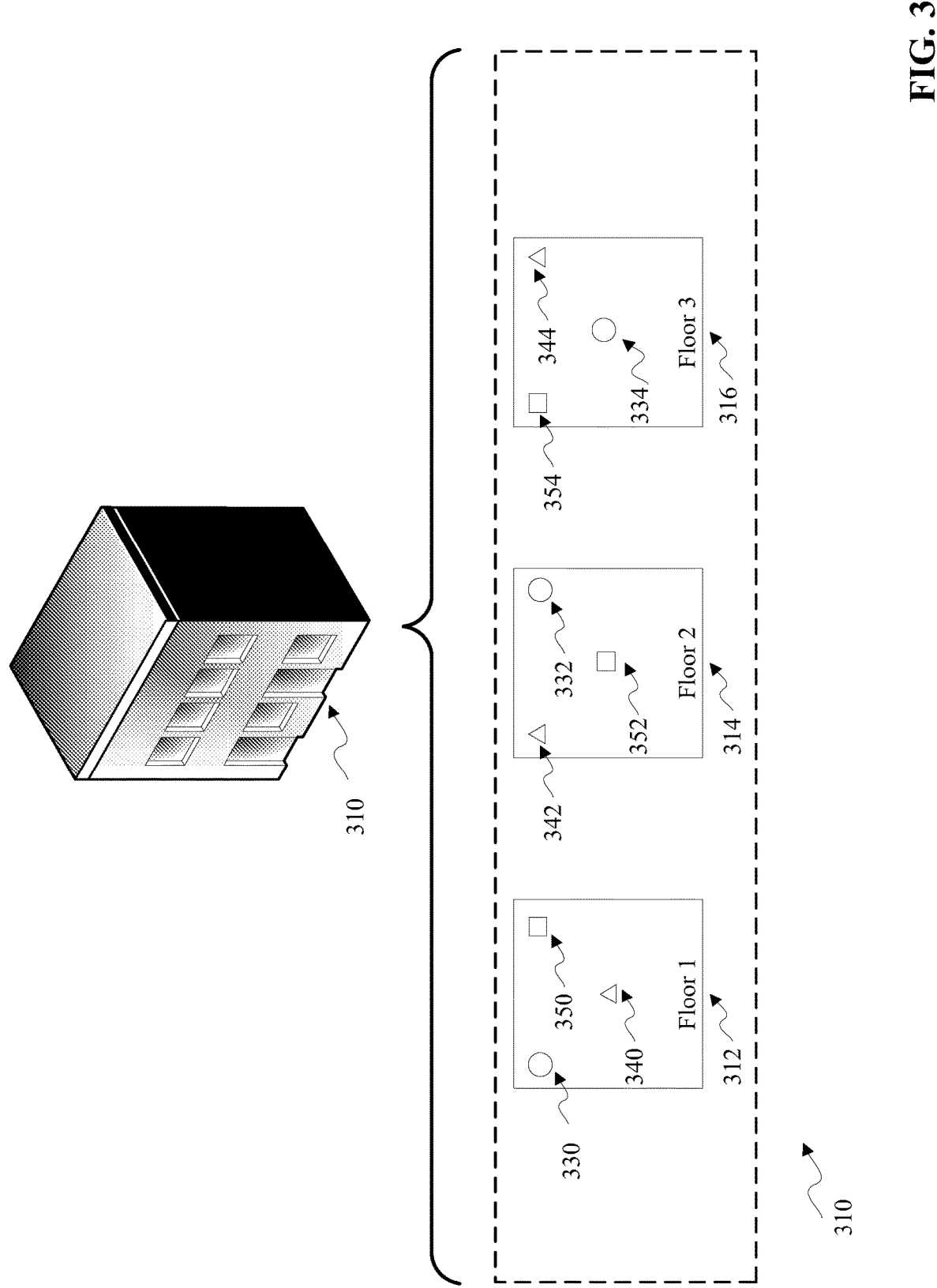
FIG. 3 illustrates an exemplary deployment of heterogeneous hardware connected elements providing data for a system that executes a dynamic ontology data operation in accordance with various embodiments described herein.

FIG. 3 illustrates an exemplary deployment of heterogeneous hardware connected elements providing data for a system that executes a dynamic ontology data operation in accordance with various embodiments described herein. A building 310 having (3) floors are illustrated. Floor (1) 312, Floor (2) 314, Floor (3) 316 are contained within the building 310. In FIG. 3, each floor has (3) connected elements of different types. For example, connected elements may be connected sensors to measure carbon dioxide 330, 332, 334 for monitoring air quality of the building 310 and communicate via a wired network connection. Connected elements may be both a connected sensor to detect ambient light and an actuator 340, 342, 344 to change the state of an occupant light fixture and communicate via a wired network connection. Connected elements may be connected sensors for temperature and humidity 350, 352, 354 to monitor environment of the building 310 and communicate via a wireless network connection.

Given the configuration illustrated in FIG. 3, each connected element may have a variety of data structures that includes, but not be limited to, sensor-specific information (temperature/humidity, carbon dioxide, and ambient light), geographic information (zone, floor, building), and network information (MAC address, IP address, wired, wireless). Other connected element information may be available as well as information relative to the operation of the connected element itself. As one example, a status of online or offline may be available to further add to the data construct for each connected element.

Further, each connected element may have an associated data structures that include, but not limited to, sensor specific information (temperature/humidity values, carbon dioxide, and ambient light in the present example), that is stored on a time, state, or unstructured basis. In this way, each connected element has a history associated with it. This history, or "data log", may be used in determining and identifying trends and/or operational characteristics in time data for particular connected elements. Further, data from combinations of history of various connected elements may analyze for trends and/or operational characteristics for a particular geographic space, system, and/or group of systems such as a building.

To realize the benefits described in this application it is beneficial to organize the physical artifacts into data models. These data models describe the various characteristics and the structure of the physical artifact in terms of available data. Characterization may be established, for example, based on capabilities of the artifact. In one example, a sensor may be described by the available functions on board that are exposed in a data interface to be utilized by application. Characterization may also be established by inferred characteristics or inferred functions. In the previous example, it may be inferred that the sensor on board may be a temperature sensor, or if multiple sensors are available, temperature, humidity, and luminosity.

It should be appreciated that multiple data models may be used in conjunction with each other to form a matrix of information regarding an artifact. For example, a house may be described with multiple data models such as a HVAC data model, security data model, and/or a smoke/fire detector model. Inferred functions may include a heating system and a cooling system for the HVAC system, door sensors and glass-break sensors for the security data models, and inferred separate smoke and fire detection systems. These data models may be amalgamated to provide a homeowner a "safe" or "not safe" indication about the status of their home.

Figure 4A:
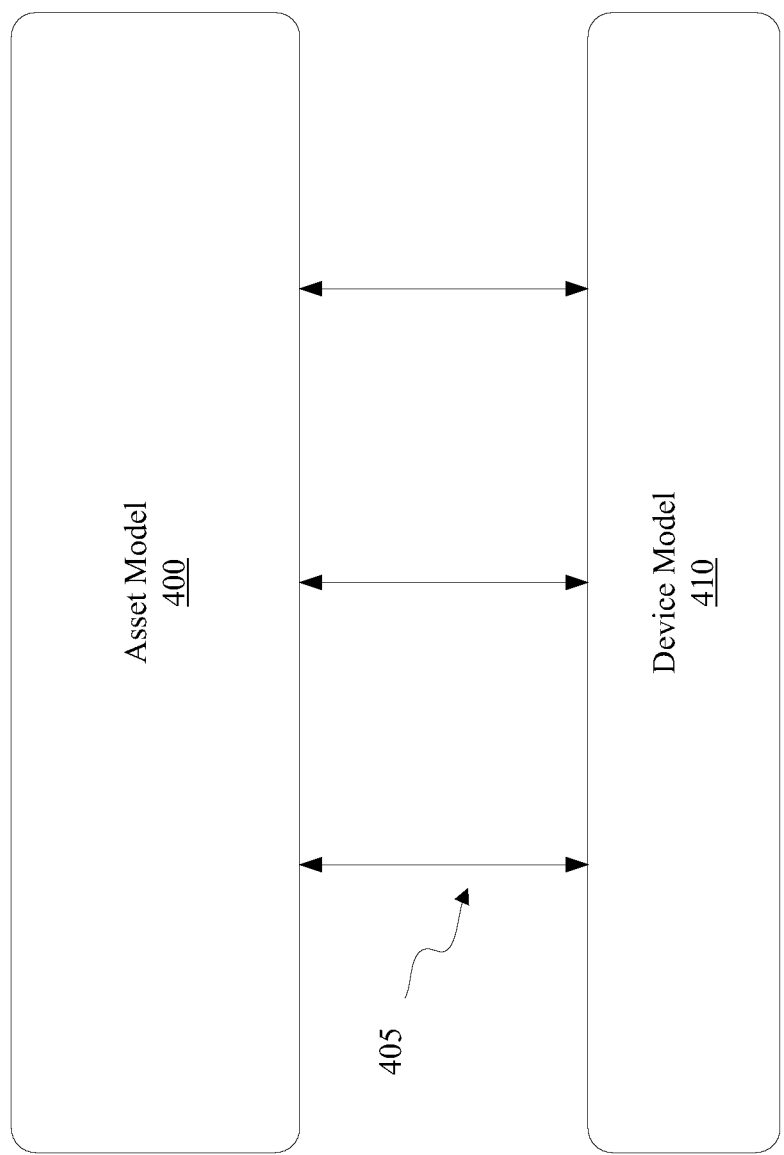
FIG. 4A illustrates an exemplary block diagram illustrating components of a dynamic ontology data operation including data model relationship in accordance with various embodiments of the disclosure.

FIG. 4A illustrates an exemplary block diagram illustrating components of a dynamic ontology data operation including data model relationship in accordance with various embodiments of the disclosure. In various embodiments described herein, there are two distinct data models including an Asset Data Model (ADM) 400 and a Device Data Model (DDM) 410. These models are connected by a Data Model Linkage (DML) 405. According to one embodiment, the DDM 410 is part of a more general domain data model. Generally, such a domain data model can describe a variety of attributes of the particular domain and may generally describe any attributes that may be relevant to the application in question. For example, the domain data model may include the device data model which models physical devices within the environment, and may also describe various physics rules and properties specific to the application in question, weather information associated with the surrounding physical environment, and so on.

In one embodiment, the ADM and DDM may be generated using an ontology generation and editing application. Examples of such applications includes, without limitation, Protégé, WebProtégé, and TopBraid Composer™. Additionally, the asset and device data models can be generated in any suitable language. Examples of such languages include, without limitation, RDF, RDFS and OWL. More generally, however, such examples of ontology generation and editing applications and languages are provided for illustrative purposes and without limitation, and one of ordinary skill in the art will recognize that any number of suitable applications and languages can be used to generate and represent the ADMs and DDMs, consistent with the functionality described herein.

An asset may be characterized as a single object or assembly of a series of objects which can be monitored. Monitoring assets as opposed to individual data streams provided by devices represents a paradigm shift away from pure data and towards asset-centric applications to fully manage a product life cycle. One reason for such shift may be the increased miniaturization of devices coupled with a price decline of embedded systems. Additionally, with the relative complexity of systems monitoring data, an increased desire exists to monitor relative information regarding the health of their assets, instead a large amount of data associated with the monitoring of their systems. Such an asset view may be a high-level representation of the physical system.

It should be appreciated that examples of an asset and associated ADM 400 may include, but are not limited to, a single sensor, combination of sensor devices, an automobile, a building, a process, and/or a combination of these things in any number or types. These assets may be of commercial, residential, or industrial scope and no limitations are placed on the context of this disclosure regarding the environment or types of assets that may benefit from this disclosure.

Similarly to an asset, a device may be characterized as a single object or assembly of a series of objects which have some capability to provide monitoring data and/or performing control operations. Such devices are numerous in scope and include examples such as temperature sensors, humidity sensors, actuators, indicators, and/or gateway devices. Devices may be an amalgam of such sensors or hardware functions that provide data. Embodiments described herein also contemplate virtual devices that may interface with hardware devices or with other software devices (e.g. data packet analyzers) that can provide data. A data representation of these devices comprises a DDM 410. A DDM 410 may or may not fully expose the capabilities of the associated device.

A linkage between an ADM 400 and DDM 410 exists that may be modified by a user or a system, manually or automatically. This Data Model Linkage (DML) 405 maps the data characteristics of the ADM 400 to the DDM 410. Such a linkage may be accomplished in various ways. Examples include but are not limited to, a user or system utilizing a tool or a service, utilizing machine learning, deep learning, and/or heuristic based approximation or other methods to provide a possible linking. Such linkages may be available immediately after creation by a user or system or may require validation by a user.

Figure 4B:
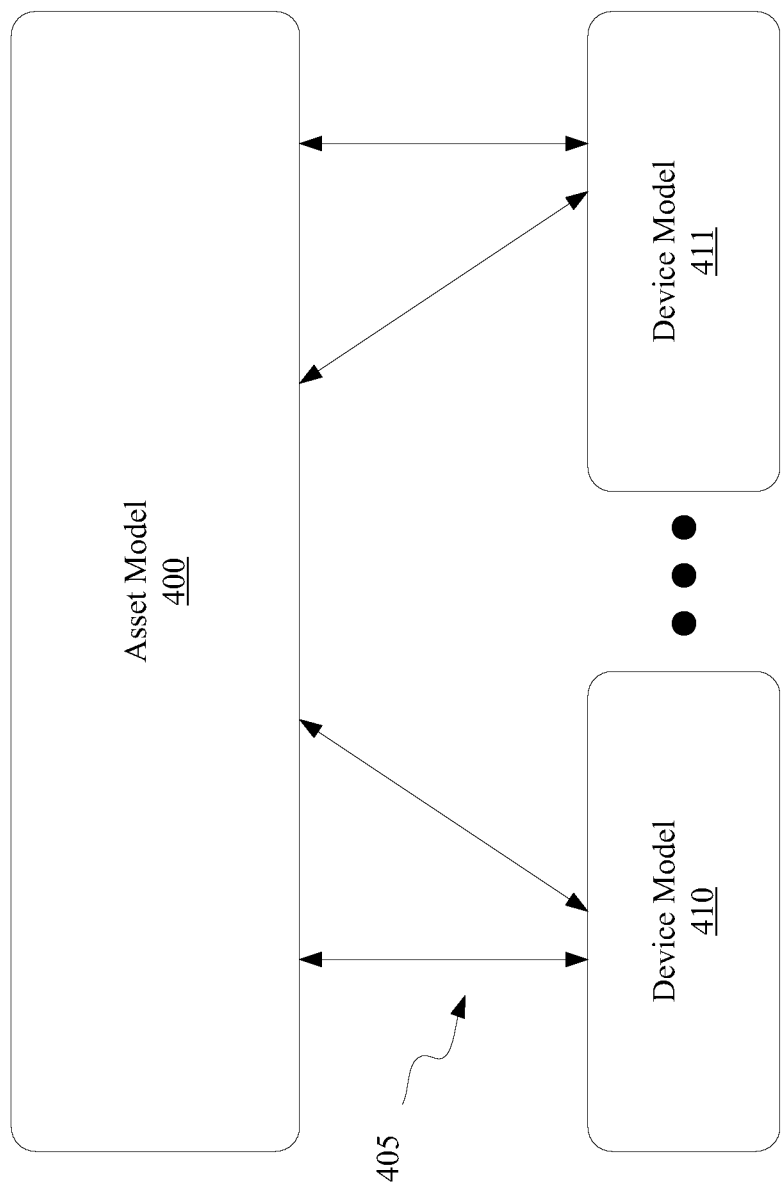
FIG. 4B illustrates an exemplary block diagram illustrating components of a dynamic ontology data operation including alternate embodiments of data model relationship in accordance with various embodiments of the disclosure.

FIG. 4B illustrates an exemplary block diagram illustrating components of a dynamic ontology data operation including alternate embodiments of data model relationship in accordance with various embodiments of the disclosure. In this example a single asset and associated ADM 400 is illustrated. It should be appreciated that embodiments described herein contemplate one or more assets and associated ADM 400. Further, as illustrated, one or more devices may be represented to monitor the asset by multiple DDM 410 and 411. These multiple DDM 410 and 411 map their data from the respective device to their respective ADM 400 via one or more DML 405. In this way one or more assets may utilize data from one or more monitoring devices.

Figure 5A:
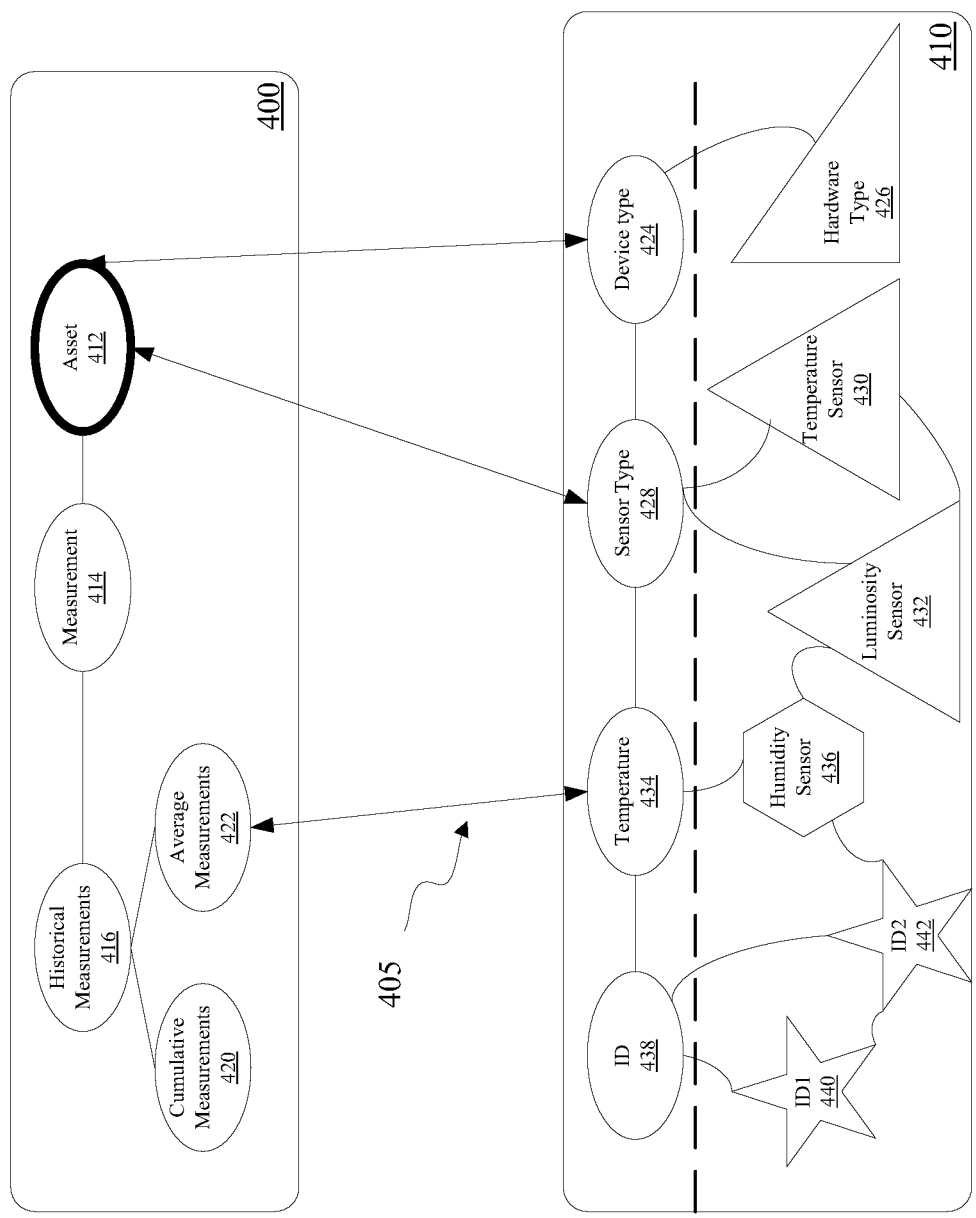
FIG. 5A illustrates an exemplary block diagram illustrating components of a dynamic ontology data operation including data model relationship and associated data model components in accordance with various embodiments of the disclosure.

FIG. 5A illustrates an exemplary block diagram illustrating components of a dynamic ontology data operation including data model relationship and associated data model components in accordance with various embodiments of the disclosure. An ADM 400 may have several associated data characteristics associated with the asset 412. Such associated data characteristics may include measurement 414, historical measurements 416, cumulative measurements 420, and average measurements 422. Additionally, the ADM 400 can include control characteristics associated with the asset 412. For example, the ADM 400 could specify that the asset includes an actuator that can be physically controlled (e.g., a physical switch capable of two different positions), that the asset includes an LED indicator with a binary display state, and so on. These data and control characteristics may be directly available based on the asset type being described. It should be appreciated that the number and type of data characteristics are various and are based on the application the data model may be utilized for.

A DDM 410 may have several associated data characteristics associated with the device itself. It should be appreciated these data characteristics may be directly available from the device and others may be inferred. Examples of direct data characteristics may be device type 424, sensor type 428, temperature 434, and ID 438. Based on these directly available data characteristics, a number of data characteristics may be inferred. Examples may include hardware type 426, temperature sensor 430, luminosity sensor 432, humidity sensor 436, ID1 440, and ID2 442. It should be appreciated that the number and type of data characteristics are various and are based on the application the data model may be utilized for. Additionally, the DDM 410 can include control state characteristics associated with the asset 412. For example, the DDM 410 could represent that the device is capable of receiving and reacting to southbound communications from an application (e.g., a local application, an application executing in a cloud computing environment, etc.). Such communications may include, for example, one or more instructions to control an aspect of the asset 412.

As described previously various DML 405 may be utilized to establish data linkages between ADM 400 and DDM 410 allowing for a seamless data querying experience between the two data models. As one example, the DDM 410 temperature data characteristic 434 is linked to the ADM 400 average measurements 422, thereby allowing an asset data characteristic 412 to query the average temperature of a DDM 410 without the need for complex understanding of the data relationships between the asset and associated devices.

Figure 5B:
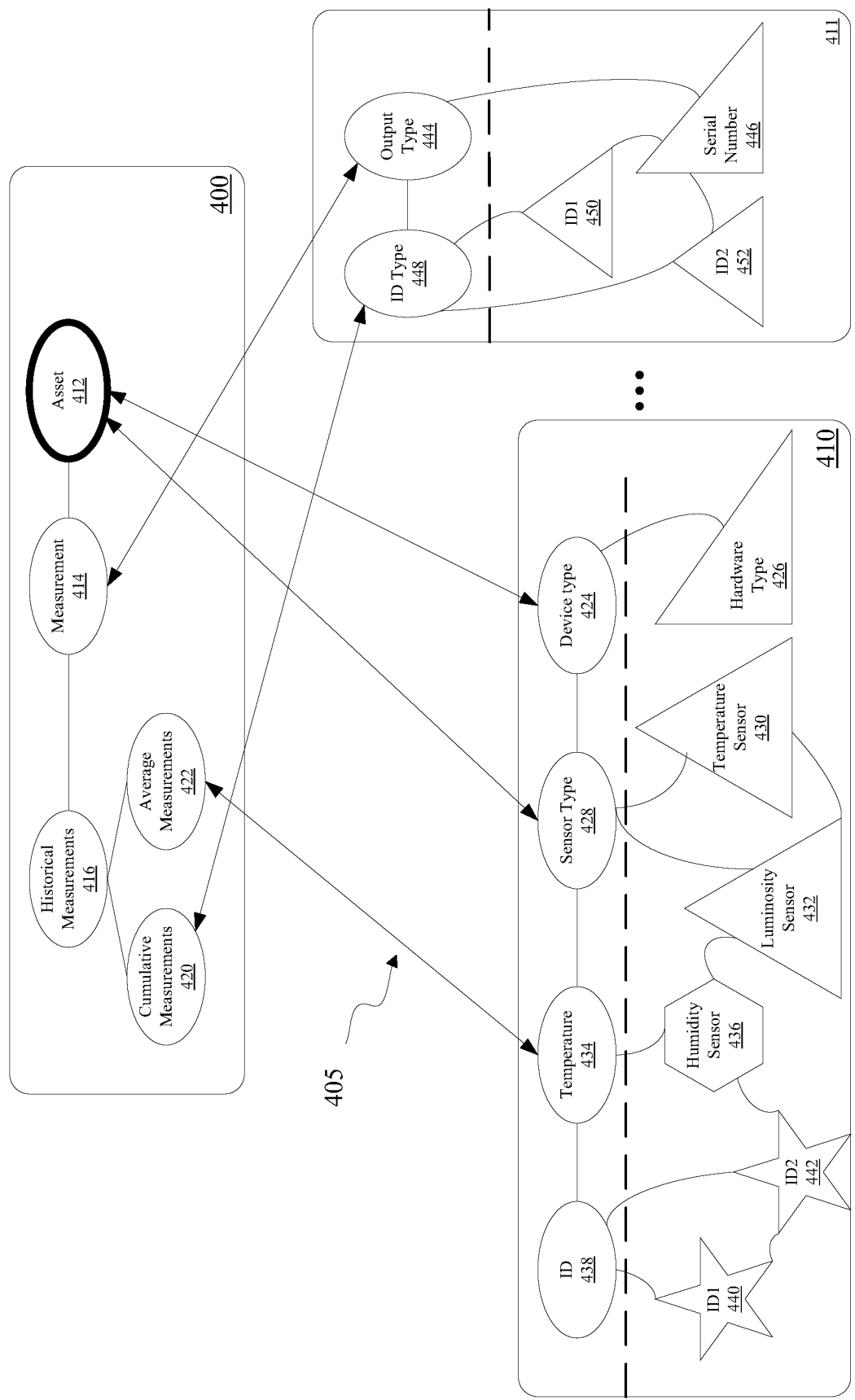
FIG. 5B illustrates an exemplary block diagram illustrating components of a dynamic ontology data operation including alternate embodiments data model relationship and associated data model components in accordance with various embodiments of the disclosure.

FIG. 5B illustrates an exemplary block diagram illustrating components of a dynamic ontology data operation including alternate embodiments data model relationship and associated data model components in accordance with various embodiments of the disclosure. In this example a single asset and associated ADM 400 are illustrated. It should be appreciated that embodiments described herein contemplate one or more assets and associated ADM 400. Further, as illustrated, one or more devices may be represented to monitor the asset by multiple DDM 410 and 411. These multiple DDM 410 and 411 map their data from the respective device to their respective ADM 400 via one or more DML 405. In this way one or more assets may utilize data from one or more monitoring devices and may be controlled according to the control schema described in the ADM 400 and DDM 410 and 411.

Similar to DDM 410, DDM 411 may have several associated data characteristics associated with the device itself. It should be appreciated these data characteristics may be directly available from the device and others may be inferred. Examples of direct data characteristics may be output type 444 and ID type 448. Based on these directly available data characteristics, a number of data characteristics may be inferred. Examples may include serial 446, ID1 450, and ID2 452. It should be appreciated that the number and type of data characteristics are various and are based on the application the data model may be utilized for.

Figure 6:
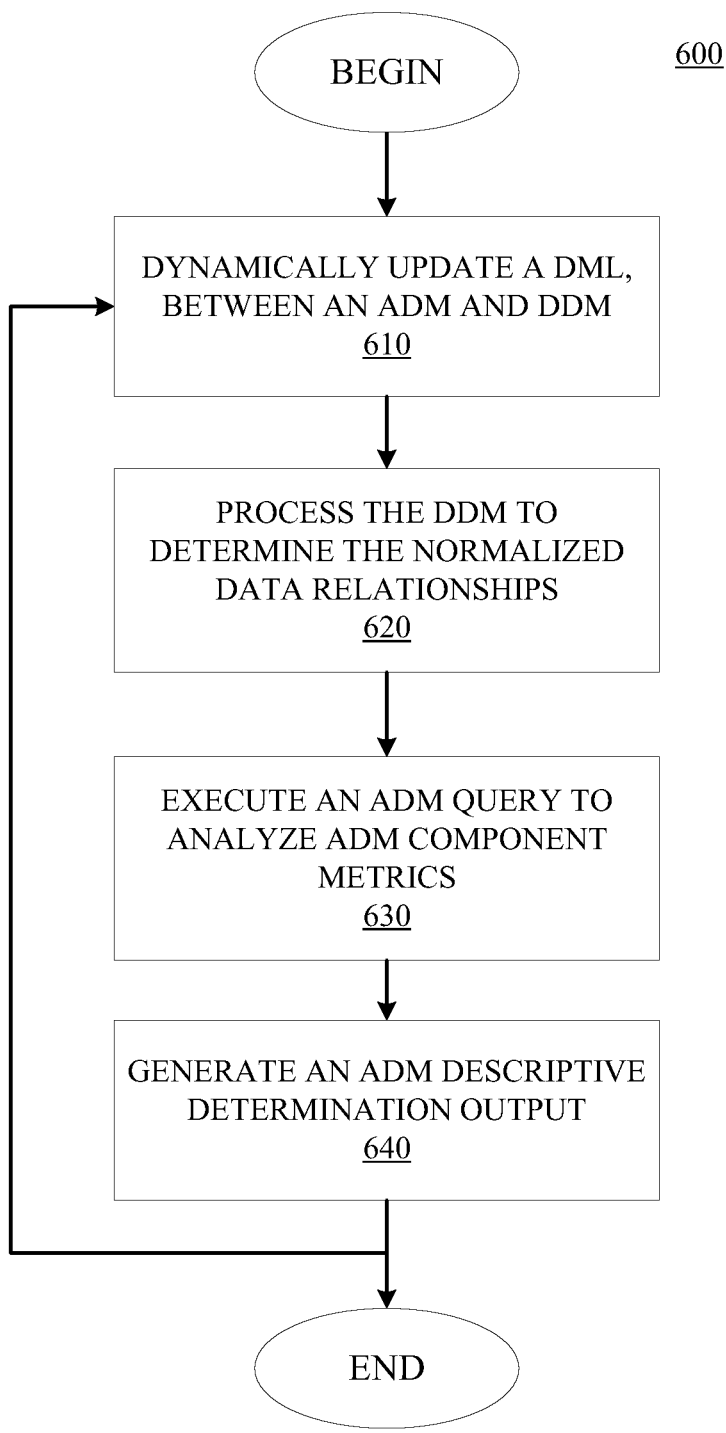
FIG. 6 illustrates an example flow diagram for methods of a dynamic ontology data operation in accordance with various embodiments of the disclosure.

FIG. 6 illustrates an example flow diagram for methods of a dynamic ontology data operation in accordance with various embodiments of the disclosure. The method 600 begins at block 610, where an inference engine dynamically updates a Data Model Link (DML) 405 between an Asset Data Model (ADM) 400 and Device Data Model (DDM) 410 that establishes relational elements between the ADM, ADM components, DDM, and DDM components. This processing establishes a dynamic link between data structures from an asset to its related devices. Examples of the inference engine can include, without limitation, FACT++, HermiT and Apache Jena™. More generally, any suitable inference or reasoning engine can be used, consistent with the functionality described herein.

An inference engine can process the DDM to determine normalized data relationship paths utilized by the inference engine and to populate DDM device element data sets (block 620) to establish which normalized data relationships are inferred. This contrasts with those relationships which are directly available as described in FIGS. 5A and 5B. It should be appreciated that processing data with an inference engine may serve to normalize the data sets available in a DDM.

This may vary based on device and application, may be physical and/or virtual. Inferred data characteristics may be used to provide advanced analytic information to the DDM and ultimately via linkages to the ADM.

According to one embodiment, the inference engine can execute an ADM query by analyzing ADM components metrics (block 630) once linkages between DDM and ADM are fully made and data is available. In this way, the engine may query the one or more linked DDMs and collect and analyze the associated data to determine what further action is necessary. The inference engine can then generate an ADM descriptive analytics determination output (block 640), which allows a user or system to monitor an asset composed of a very complex set of devices. Examples may include a single "go" "no-go" dashboard for critical elements of a process, operation, facility, residence, or other application physical or virtual. Further, these analytics are not static and may be dynamically refactored as necessary. Additionally, as additional DDMs are made available, additional and/or modified linkages may be created to augment the desired ADM descriptive analytics.

Figure 7:
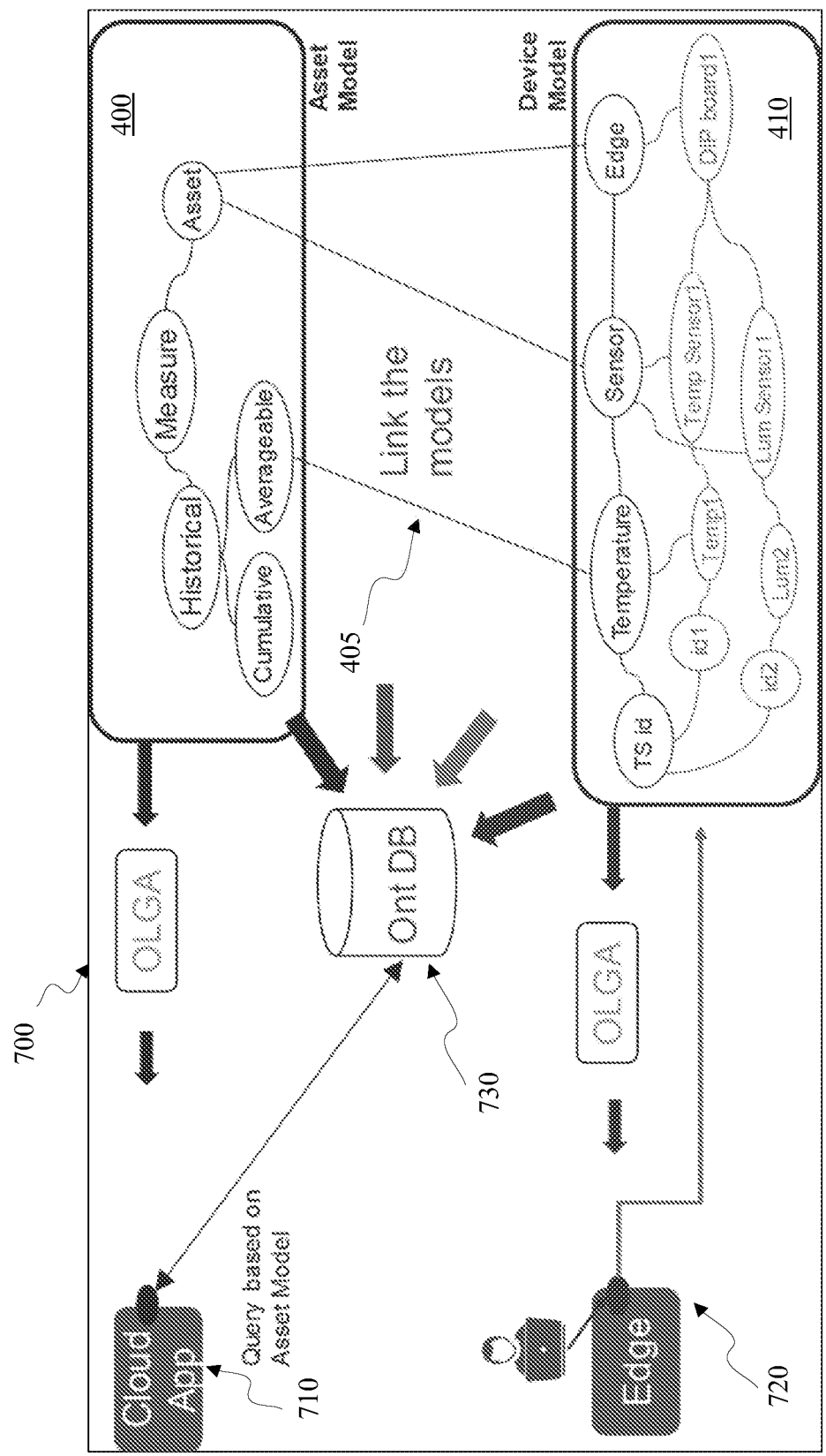
FIG. 7 illustrates an example block diagram for a system of a dynamic ontology data operation in accordance with various embodiments of the disclosure.

FIG. 7 illustrates an example block diagram for a system of a dynamic ontology data operation in accordance with various embodiments of the disclosure. Elements of a system may further include one or more ADMs 400, DDMs 410, an Ontology Library GenerAtor (OLGA) 700, assembled libraries as output from OLGA 700, and linking models DML 405.

In one of many examples, the ADM 400 and DDM 410 provide data models to the OLGA 700. Such a method may comprise defining an ontological model, generating an ontology library based on the ontological model, deploying the ontology library to an IoT system, generating an ontology instance based on the ontology library deployed to the IoT system, modifying an IoT application based on the ontology instance, and managing the IoT system utilizing the IoT application.

The OLGA 700 may create one or more ADM and/or DDM libraries associated with the ADM and DDMs, respectively. The one or more DDM libraries may have an inference engine run against it to normalize the data characteristics that a DDM may have. One or more link models DLM 405 may be created to establish a data relationship between the ADM 400 and DDM 410. This linkage allows the collection of ontological-based data to populate ontology DB for queries and further action. For example, a single "go"/"no-go" dashboard for critical elements of a process, operation, facility, residence, or other application physical or virtual.

Additionally, data from the various ADMs and DDMs may be replicated into an ontology database 730 to be semantically queried by a user and/or system as needed. Additionally, data may be configured to be time series data and placed into a data structure (not shown) for later access by and user and/or system.

Figure 8:
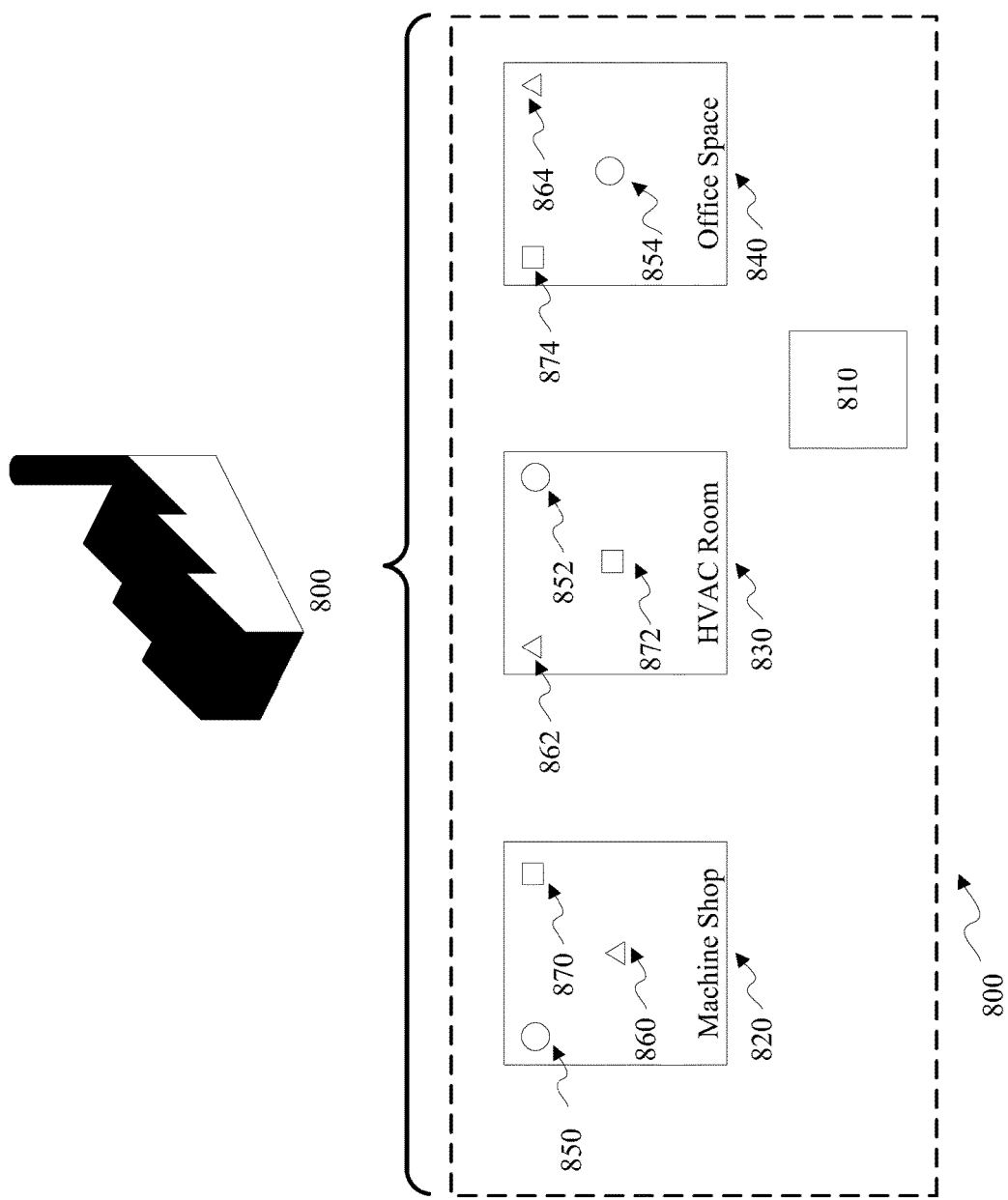
FIG. 8 illustrates an example functional block diagram of a dynamic ontology data operation in accordance with various embodiments of the disclosure.
Figure 9:
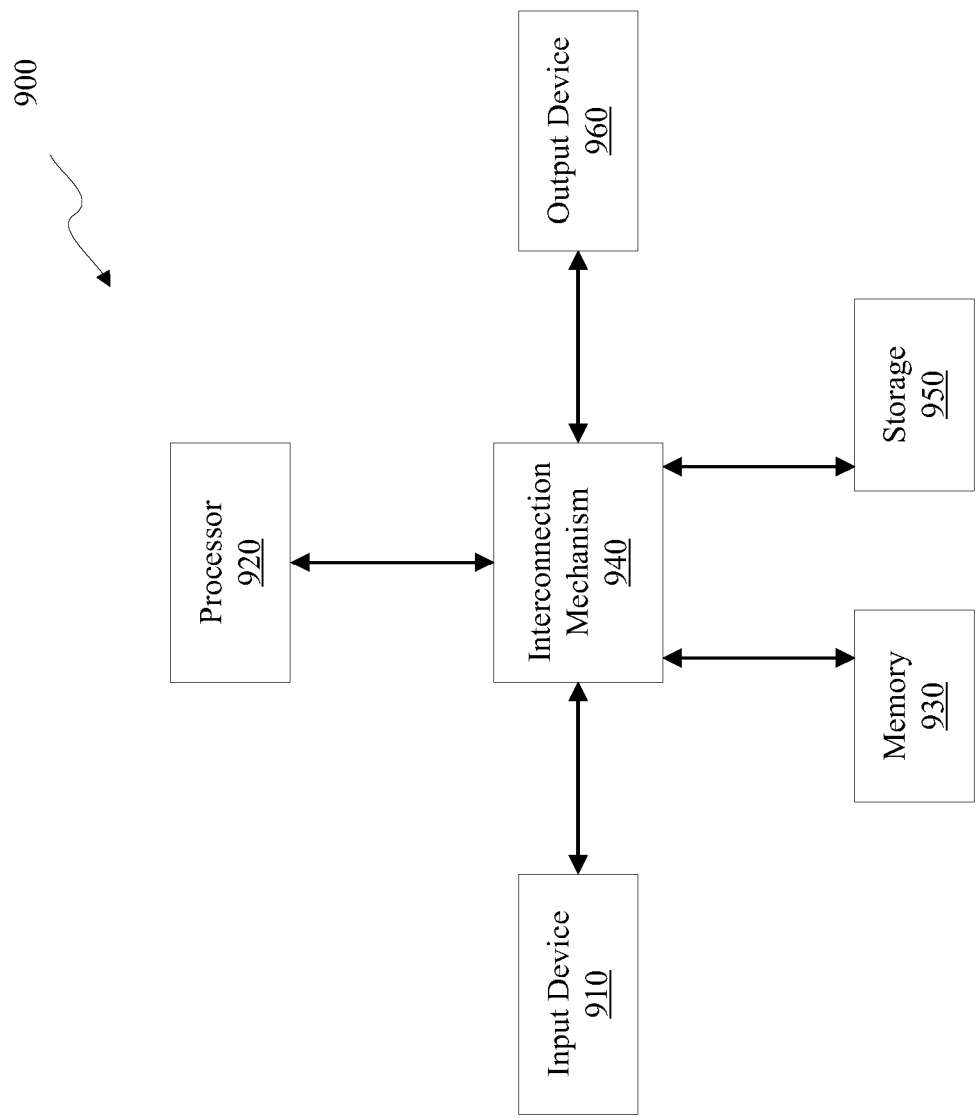
FIG. 9 is a functional block diagram of a general-purpose computer system in accordance with embodiments described herein.

FIG. 8 illustrates an example functional block diagram of a dynamic ontology data operation in accordance with various embodiments of the disclosure. An industrial building 800 having three distinct building sections illustrated including: a machine shop 820, HVAC Room 830, and Office Space 840. Each distinct building section has three connected elements of different types, including connected sensors to measure carbon dioxide sensor connected elements 850, 852, 854 and connected sensors to detect occupancy/actuate for lighting connected elements 860, 862, 864. Connected elements may be connected sensors for power measurement 870, 872, 874 to monitor energy consumption of the sections of the building 800. A dynamic ontology data operation system 810 may be located on premise in the present example, but is not required to be co-located with the facility.

Utilizing the method for ontology data operation there may be one or more assets involved. For example, each floor may itself be an asset with an associated ADM descriptive analytics determination output such as a "go"/"no-go" indicator. Further the industrial building 800 itself may be an asset with an associated ADM descriptive analytics determination output.

A machine shop foreman may be responsible for monitoring the sensors 850, 860, and 870 associated with the machine shop floor 820 and if the related analytic is a "no-go", the foreman could stop, suspend, and/or terminate work on the floor for further action. This paradigm could be followed for the HVAC Room 830 and Office Space 840. Additionally, a building safety team may have ADM descriptive analytics which are an aggregate of these floors (Machine Shop 820, HVAC Room 830, and Office Space 840) and may or may not include additional ADMs or DDMs. In one embodiment, the ADM and/or DDMs can model controllable aspects of the various devices within the environment. For example, the lighting connected elements 860, 862, and 864 could provide an interface through which control commands can be remotely submitted (e.g., to turn on or off a light(s), to dim the light(s), etc.) and this functionality can be represented within the ADM and/or DDMs. In such an embodiment, control logic can generate a control operation for one of the lighting connected elements 860, 862 and 864 based on the available functionality for the lighting elements described in the ADM and/or DDMS. A command instruction(s) for the lighting element can then be generated using the ADM and/or DDMs, and transmitted (e.g., using a data communications network) to the lighting element for execution.

This example is illustrative of the dynamic and highly configurable nature of the disclosure where ADMs, DDMs, and DML associated with each other give rise to a wide variety of ADM descriptive analytics that may be utilized for a wide array of application. General purpose computer components may be used and configured as components of a rack intrusion detection system. Such computer systems may be used in various embodiments described herein, for example, general-purpose computers such as those based on Intel PENTIUM-type processor, Motorola PowerPC, ARM processor, Sun UltraSPARC, Hewlett-Packard PA-RISC processors, or any other type of processor.

Figure 10:
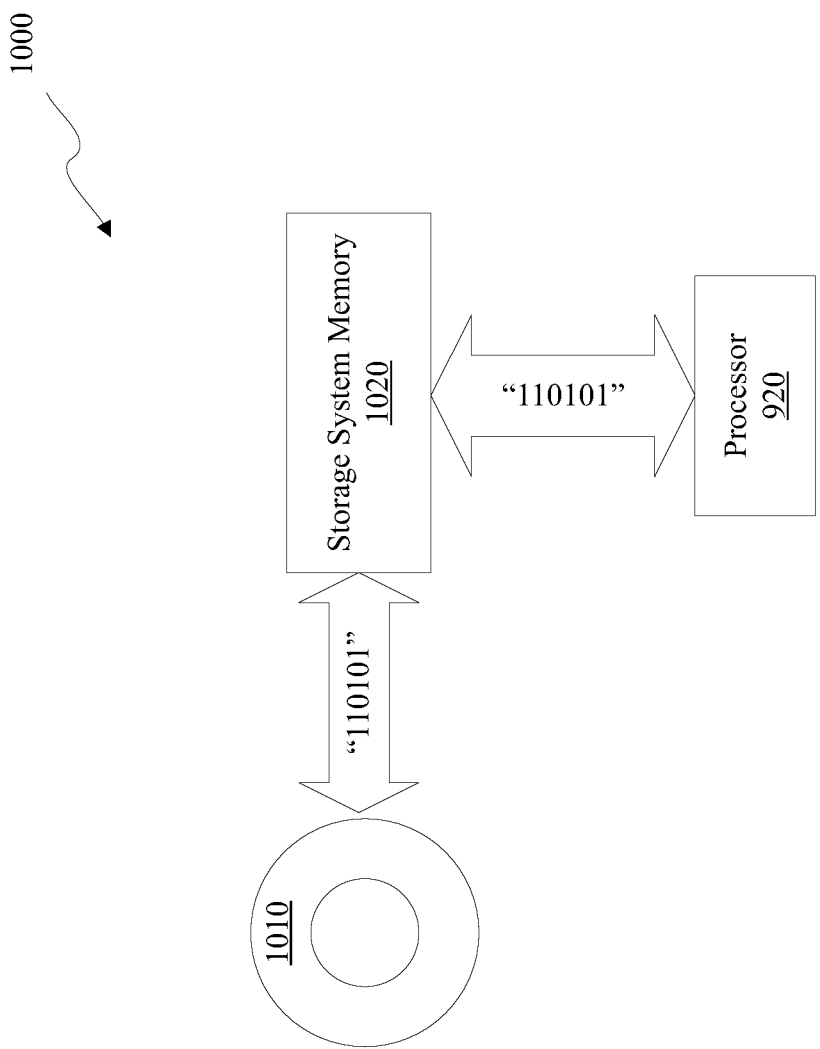
FIG. 10 is a functional block diagram of a general-purpose storage system in accordance with the general-purpose computer system of FIG. 9.

For example, various embodiments of the systems and methods for dynamically configuring a custom device for a cloud-based environment may utilize or be implemented utilizing specialized software executing in computer system components 1000 such as that shown in FIG. 10. Embodiments of this computer system components 1000 may be general-purpose in nature. The computer system components 1000 may include a processor 1020 connected to one or more memory devices 1030, such as a disk drive, memory, or other device for storing data. Memory 1030 is typically used for storing programs and data during operation of the computer system components 1000. The computer system components 1000 may also include a storage system 1050 that provides additional storage capacity. Components of computer system 1000 may be coupled by an interconnection mechanism 1040, which may include one or more busses (e.g., between components that are integrated within the same machine) and/or a network (e.g., between components that reside on separate discrete machines). The interconnection mechanism 1040 enables communications (e.g., data, instructions) to be exchanged between computer system components 1000.

Computer system components 1000 also includes one or more input devices 1010, for example, a keyboard, mouse, trackball, microphone, touch screen, and one or more output devices 1060, for example, a printing device, display screen, speaker. In addition, computer system 1000 may contain one or more interfaces (not shown) that connect computer system 1000 to a communication network (in addition or as an alternative to the interconnection mechanism 1040).

The storage system 1050, shown in greater detail in FIG. 10, typically includes a computer readable and writeable nonvolatile recording medium 1010 in which signals are stored that define a program to be executed by the processor or information stored on or in the medium 1010 to be processed by the program to perform one or more functions associated with embodiments described herein. The medium may, for example, be a disk or flash memory. Typically, in operation, the processor causes data to be read from the nonvolatile recording medium 1010 into another memory 1020 that allows for faster access to the information by the processor than does the medium 1010. This memory 1020 is typically a volatile, random access memory such as a dynamic random-access memory (DRAM) or static memory (SRAM). It may be located in storage system 1000, as shown, or in memory system 1030. The processor 1020 generally manipulates the data within the integrated circuit memory 1030, 1020 and then copies the data to the medium 1010 after processing is completed. A variety of mechanisms are known for managing data movement between the medium 1010 and the integrated circuit memory element 1030, 1020, and the disclosure is not limited thereto. The disclosure is not limited to a particular memory system 1030 or storage system 1050.

The computer system may include specially-programmed, special-purpose hardware, for example, an Application Specific Integrated Circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the disclosure may be practiced, it should be appreciated that aspects of the disclosure are not limited to being implemented on the computer system as shown in FIG. 10. Various aspects of the disclosure may be practiced on one or more computers having a different architecture or components shown in FIG. 10. Further, where functions or processes of embodiments of the disclosure are described herein (or in the claims) as being performed on a processor or controller, such description is intended to include systems that use more than one processor or controller to perform the functions.

Computer system 1000 may be a general-purpose computer system that is programmable using a high-level computer programming language. Computer system 1000 may be also implemented using specially programmed, special purpose hardware. In computer system 1000, processor 1020 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME), Windows XP, Vista, or Windows 7, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., In Line) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically so as to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure and are intended to be within the spirit and scope of the disclosure. Accordingly, the foregoing description and drawings are by way of example only.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The present disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for description purposes and should not be regarded as limiting. The use of "including," "comprising," "having," "containing," "involving," and variations herein, are meant to be open-ended, i.e. "including but not limited to."

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method, comprising:
    dynamically updating a first data model link between a first one or more asset data model components of an asset data model and a first one or more device data model components of a device data model, wherein the device data model contains data collected from a plurality of devices and control operations performed upon the plurality of devices, and organized based on one or more attributes of the plurality of devices and the first data model link maps data characteristics of the first one or more asset data model components of the asset data model to the first one or more device data model components of the device data model;

processing the device data model to determine normalized data relationship paths utilized by an inference engine to populate a device element data set, wherein at least a first determined normalized data relationship path for a first one or more devices is inferred;

executing, by operation of one or more computer processors, an asset data model query against the asset data model comprising analyzing asset data model component metrics by querying the device element data set, based on the updated first data model link;

executing a control operation based on the asset data model query against the device element data set and the updated first data model link; and generating an asset data model descriptive analytics determination output, based on the execution of the asset data model query.

2. The method of claim 1, wherein generating the asset data model descriptive analytics determination output further comprises:

selecting a first state from a plurality of states to assign to a first element of at least one of a process, an operation, a facility, and a residence.

3. The method of claim 2, wherein generating the asset data model descriptive analytics determination output further comprises:

dynamically updating a graphical user interface for a dashboard for monitoring the at least one of the process, the operation, the facility, and the residence, based on the determined state for the first element.

4. The method of claim 2, wherein generating the asset data model descriptive analytics determination output further comprises:

selecting a control instruction based on the state; and
transmitting an electronic notification over a data communications network including the control instruction to cause a control device to perform a corresponding operation.

5. The method of claim 1, further comprising:

upon determining that a second device data model has become available, dynamically generating a plurality of data model links between a plurality of asset data model components of the asset data model and a plurality of device data model components of the second device data model.

6. The method of claim 1, further comprising:

processing, by an ontology library generator, at least one of the asset data model and the device data model, to define an ontological model.

7. The method of claim 6, further comprising:

generating an ontology library based on the ontological model;
deploying the ontology library to a first computing node;
generating an ontology instance based on the ontology library deployed to the first computing node;
modifying a first software application, based on the ontology instance; and
managing the first computing node utilizing the modified first software application.

8. The method of claim 1, further comprising:

dynamically generating a graphical user interface for modifying the device data model to include a new device, using the asset data model and a domain data model, wherein the domain data model includes the device data model as well as other domain-specific information.

9. The method of claim 8, dynamically generating the graphical user interface further comprises:

generating a first interface page for creating links between the new device and a second one or more asset data model components of the asset data model;
generating a second interface page for defining attributes of data generated by the new device; and
generating a third interface for defining one or more organizational relationships associated with the new device.

10. The method of claim 1, wherein the device data model is a data model for a monitorable device characterized as an assembly of a series of objects, and the asset data model is a data model for a monitorable asset characterized as an assembly of a series of objects.

11. The method of claim 1, wherein the first data model link maps data characteristics of a selected component from a plurality of asset data model components of the asset data model to a selected component from a plurality of device data model components of the device data model.

12. The method of claim 1, further comprising:

managing a plurality of asset data models including the asset data model, a plurality of device data models including the device data model, and a plurality of data model links between the plurality of asset data models and the device data models, the data model links mapping data characteristics of selected ones of the plurality of asset data models to data characteristics of selected ones of the plurality of device data models, the data model links including the first data model link, wherein an asset data model descriptive analytics determination output is generatable for each of the plurality of asset data models based on an execution of an associated asset data model query.

13. A system, comprising:

one or more computer processors; and
a memory containing computer program code that, when executed by operation of the one or more computer processors, performs an operation comprising:
dynamically updating a first data model link between a first one or more asset data model components of an asset data model and a first one or more device data model components of a device data model, wherein the device data model contains data collected from a plurality of devices and organized based on one or more attributes of the plurality of devices and the first data model link maps data characteristics of the first one or more asset data model components of the asset data model to the first one or more device data model components of the device data model;
processing the device data model to determine normalized data relationship paths utilized by an inference engine to populate a device element data set, wherein at least a first determined normalized data relationship path for a first one or more devices is inferred;
executing an asset data model query against the asset data model comprising analyzing asset data model component metrics by querying the device element data set, based on the updated first data model link;

executing a control operation based on the asset data model query against the device element data set, based on the updated first data model link; and generating an asset data model descriptive analytics determination output, based on the execution of the asset data model query.

14. The system of claim 13, wherein generating the asset data model descriptive analytics determination output further comprises:

selecting a first state from a plurality of potential states to assign to a first element of at least one of a process, an operation, a facility, and a residence.

15. The system of claim 14, wherein generating the asset data model descriptive analytics determination output further comprises:

dynamically updating a graphical user interface for a dashboard for monitoring the at least one of the process, the operation, the facility, and the residence, based on the determined state for the first element.

16. The system of claim 14, wherein generating the asset data model descriptive analytics determination output further comprises:

selecting a control instruction based on the state; and transmitting an electronic notification over a data communications network including the control instruction to cause a control device to perform a corresponding operation.

17. The system of claim 13, the operation further comprising:

upon determining that a second device data model has become available, dynamically generating a plurality of data model links between a plurality of asset data model components of the asset data model and a plurality of device data model components of the second device data model.

18. The system of claim 13, the operation further comprising:

processing, by an ontology library generator, at least one of the asset data model and the device data model, to define an ontological model.

19. The system of claim 18, the operation further comprising:

generating an ontology library based on the ontological model;

deploying the ontology library to a first computing node;

generating an ontology instance based on the ontology library deployed to the first computing node;

modifying a first software application, based on the ontology instance; and managing the first computing node utilizing the modified first software application.

20. A non-transitory computer-readable medium containing computer program code that, when executed by operation of one or more computer processors, performs an operation comprising:

dynamically updating a first data model link between a first one or more asset data model components of an asset data model and a first one or more device data model components of a device data model, wherein the device data model contains data collected from a plurality of devices and organized based on one or more attributes of the plurality of devices and the first data model link maps data characteristics of the first one or more asset data model components of the asset data model to the first one or more device data model components of the device data model;

processing the device data model to determine normalized data relationship paths utilized by an inference engine to populate a device element data set, wherein at least a first determined normalized data relationship path for a first one or more devices is inferred;

executing an asset data model query against the asset data model comprising analyzing asset data model component metrics by querying the device element data set, based on the updated first data model link;

executing a control operation based on the asset data model query against the device element data set, based on the updated first data model link; and generating an asset data model descriptive analytics determination output, based on the execution of the asset data model query.

21. The non-transitory computer-readable medium of claim 20, wherein generating the asset data model descriptive analytics determination output further comprises:

selecting a first state from a plurality of states to assign to a first element of at least one of a process, an operation, a facility, and a residence; and dynamically updating a graphical user interface for a dashboard for monitoring the at least one of the process, the operation, the facility, and the residence, based on the determined state for the first element.

22. The non-transitory computer-readable medium of claim 20, the operation further comprising:

upon determining that a second device data model has become available, dynamically generating a plurality of data model links between a plurality of asset data model components of the asset data model and a plurality of device data model components of the second device data model.

23. The non-transitory computer-readable medium of claim 20, the operation further comprising:

processing, by an ontology library generator, at least one of the asset data model and the device data model, to define an ontological model;

generating an ontology library based on the ontological model;

deploying the ontology library to a first computing node;

generating an ontology instance based on the ontology library deployed to the first computing node;

modifying a first software application, based on the ontology instance; and managing the first computing node utilizing the modified first software application.

* * * * *